United States Patent
Oobayashi et al.

(10) Patent No.: US 12,288,173 B2
(45) Date of Patent: Apr. 29, 2025

(54) VEHICLE ALLOCATION MANAGEMENT METHOD AND VEHICLE ALLOCATION MANAGEMENT DEVICE

(71) Applicant: DENSO CORPORATION, Kariya (JP)

(72) Inventors: Hironori Oobayashi, Kariya (JP); Akihiro Imura, Kariya (JP)

(73) Assignee: DENSO CORPORATION, Kariya (JP)

( * ) Notice: Subject to any disclaimer, the term of this patent is extended or adjusted under 35 U.S.C. 154(b) by 42 days.

(21) Appl. No.: 17/644,701

(22) Filed: Dec. 16, 2021

(65) Prior Publication Data
US 2022/0108248 A1   Apr. 7, 2022

Related U.S. Application Data

(63) Continuation of application No. PCT/JP2020/012558, filed on Mar. 20, 2020.

(30) Foreign Application Priority Data

Jun. 21, 2019 (JP) .................................. 2019-115602

(51) Int. Cl.
*G06Q 10/0631* (2023.01)
*B60L 53/62* (2019.01)
(Continued)

(52) U.S. Cl.
CPC ........ *G06Q 10/06315* (2013.01); *B60L 53/62* (2019.02); *B60L 53/64* (2019.02);
(Continued)

(58) Field of Classification Search
CPC .. Y02T 10/70; G06Q 10/06315; G06Q 10/02; G06Q 50/06; G06Q 10/0631;
(Continued)

(56) References Cited

U.S. PATENT DOCUMENTS

2016/0039295 A1*  2/2016  Madurai-Kumar ..... B60L 53/64
                                                    320/109
2019/0039467 A1*  2/2019  Hortop .................. H02J 7/0071
(Continued)

FOREIGN PATENT DOCUMENTS

CN       102095427 A    6/2011
JP     2012-073979 A    4/2012
(Continued)

OTHER PUBLICATIONS

J. Shi, et al. "Routing Electric Vehicle Fleet for Ride-Sharing," 2018 2nd IEEE Conference on Energy Internet and Energy System Integration (EI2), Beijing, China, 2018, pp. 1-6, doi: 10.1109/EI2. 2018.8582518 < https://ieeexplore.ieee.org/document/8582518?source=IQplus> (Year: 2018).*

*Primary Examiner* — Jerry O'Connor
*Assistant Examiner* — Michael R Koester
(74) *Attorney, Agent, or Firm* — Maschoff Brennan

(57) ABSTRACT

A vehicle allocation management method, which is executed by a computer to manage an allocation of service vehicles used in a mobility service to a user, includes instructions to be executed by at least one processor. The instructions include: estimating an energy consumption generated in response to a service provision to the user; estimating a performance deterioration of a service vehicle associated with the service provision to the user; generating an operation plan to be provided to the service vehicle with consideration of the energy consumption and the performance deterioration; obtaining, from the service vehicle, a modified operation plan which is estimated to be able to suppress at least one of the energy consumption or the performance deterioration compared with the operation plan that is generated; and determining whether to approve an operation of (Continued)

the service vehicle under the modified operation plan obtained from the service vehicle.

12 Claims, 9 Drawing Sheets

(51) Int. Cl.
*B60L 53/64* (2019.01)
*B60R 16/023* (2006.01)
*G06Q 10/0633* (2023.01)
*G06Q 50/40* (2024.01)
*G08G 1/123* (2006.01)

(52) U.S. Cl.
CPC ... *B60R 16/0231* (2013.01); *G06Q 10/06312* (2013.01); *G06Q 10/0633* (2013.01); *G06Q 50/40* (2024.01); *G08G 1/123* (2013.01)

(58) Field of Classification Search
CPC .......... G06Q 50/30; G06Q 10/06; G05F 1/66; B60L 53/62; G01C 21/3469
See application file for complete search history.

(56) References Cited

U.S. PATENT DOCUMENTS

2019/0126766 A1 5/2019 Taguchi et al.
2020/0043257 A1* 2/2020 Venkiteswaran ...... G07C 5/085

FOREIGN PATENT DOCUMENTS

JP 2013-090359 A 5/2013
JP 6564502 B1 * 8/2019 ................ B60L 3/00
WO WO-2018217640 A1 * 11/2018 ....... G06Q 10/06315

* cited by examiner

VEHICLE ALLOCATION MANAGEMENT METHOD AND VEHICLE ALLOCATION MANAGEMENT DEVICE

CROSS REFERENCE TO RELATED APPLICATION

The present application is a continuation application of International Patent Application No. PCT/JP2020/012558 filed on Mar. 20, 2020, which designated the U.S. and claims the benefit of priority from Japanese Patent Application No. 2019-115602 filed on Jun. 21, 2019. The entire disclosures of all of the above applications are incorporated herein by reference.

TECHNICAL FIELD

The present disclosure relates to an allocation management of service vehicles.

BACKGROUND

There has been known a method for managing allocation of electric vehicles with consideration of electric power charging time and travel distances of electric vehicles.

SUMMARY

The present disclosure provides a vehicle allocation management method including: estimating an energy consumption generated in response to a service provision to the user; estimating a performance deterioration of a service vehicle associated with the service provision to the user; generating an operation plan to be provided to the service vehicle with consideration of the energy consumption and the performance deterioration; obtaining, from the service vehicle, a modified operation plan which is estimated to be able to suppress at least one of the energy consumption or the performance deterioration compared with the operation plan that is generated; and determining whether to approve an operation of the service vehicle under the modified operation plan obtained from the service vehicle.

BRIEF DESCRIPTION OF DRAWINGS

Objects, features and advantages of the present disclosure will become apparent from the following detailed description made with reference to the accompanying drawings. In the drawings.

DETAILED DESCRIPTION

Figure 1:
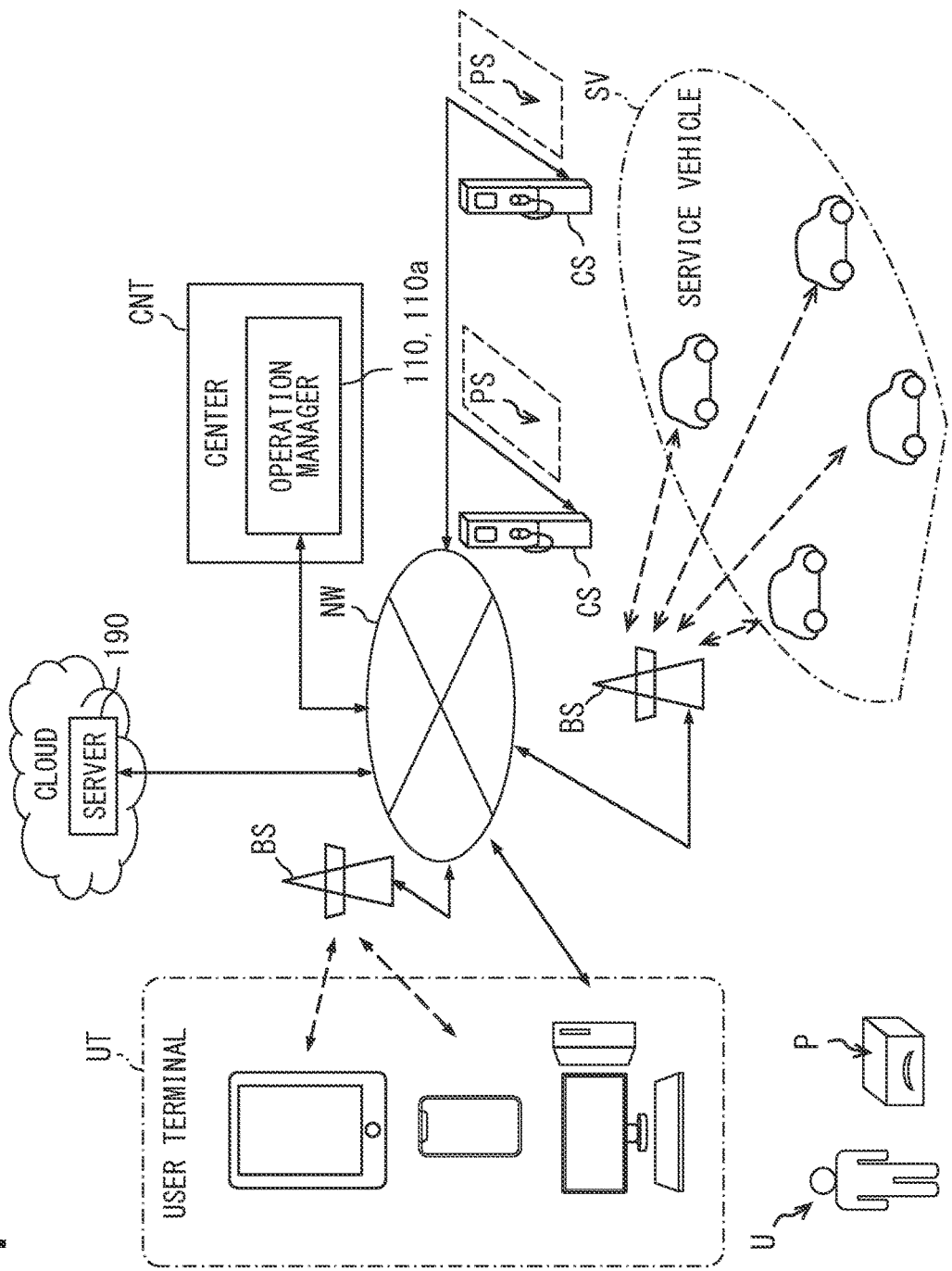
FIG. 1 is a diagram schematically showing an overall image of a mobility service system according to an embodiment of the present disclosure.

There has been known a method for managing allocation of electric vehicles (EV) in which allocation of electric vehicles is executed to satisfy users of the electric vehicle allocation with consideration of electric power charging time and travel distances of electric vehicles.

In the electric vehicle used in the allocation service, a performance of battery for travelling purpose is likely to deteriorate, and thereby deteriorating a performance of the electric vehicle. As a result, vehicle allocation and operation that worsen the performance deterioration of the electric vehicle are carried out, and the life cycle cost of the service vehicles is increased. Such increase of life cycle cost of the service vehicles adversely affect a profit of a provider who provides the mobility service.

According to an aspect of the present disclosure, a vehicle allocation management method executed by a computer to manage an allocation of service vehicles used in a mobility service to a user is provided. The vehicle allocation management method includes instructions to be executed by at least one processor. The instructions include: estimating an energy consumption generated in response to a service provision to the user; estimating a performance deterioration of a service vehicle associated with the service provision to the user; generating an operation plan to be provided to the service vehicle with consideration of the energy consumption and the performance deterioration; obtaining, from the service vehicle, a modified operation plan which is estimated to be able to suppress at least one of the energy consumption or the performance deterioration compared with the operation plan that is generated; and determining whether to approve an operation of the service vehicle under the modified operation plan obtained from the service vehicle.

According to another aspect of the present disclosure, a vehicle allocation management device that manages an allocation of service vehicles used in a mobility service to a user is provided. The vehicle allocation management device includes: a consumption estimation unit that estimates an energy consumption generated in response to a service provision to the user; a deterioration estimation unit that estimates a performance deterioration of a service vehicle associated with the service provision to the user; a plan generation unit that generates an operation plan to be provided to the service vehicle with consideration of the energy consumption and the performance deterioration; and a plan provision approval unit that obtains, from the service vehicle, a modified operation plan which is estimated to be able to suppress at least one of the energy consumption or the performance deterioration compared with the operation plan generated by the plan generation unit. The plan generation unit determines whether to approve an operation of the service vehicle under the modified operation plan obtained from the service vehicle.

According to the above method and device, the operation plan provided to the service vehicle considers both of the energy consumption required for the service provision and the performance deterioration of the service vehicle. Thus, the operation of the service vehicle according to an operation plan that worsens the deterioration of performance can be avoided. Thus, an increase in life cycle cost of the service vehicle can be suppressed. This configuration can provide vehicle allocation management that is highly convenient for mobility service provider.

FIG. 1 shows a mobility service system according to an embodiment of the present disclosure. As shown in FIG. 1, the mobility service system includes a payment management center, an operation management center CNT, and multiple service vehicles SV. The mobility service system manages travelling of the multiple service vehicles SV using the operation management center CNT, and enables the user U to travel with the service vehicle SV. The mobility service system collects the service charge for providing the mobility service using the payment management system. The payment management center, the operation management center CNT, and each service vehicle SV are connected to a network NW, and can communicate with one another through the network.

Figure 2:
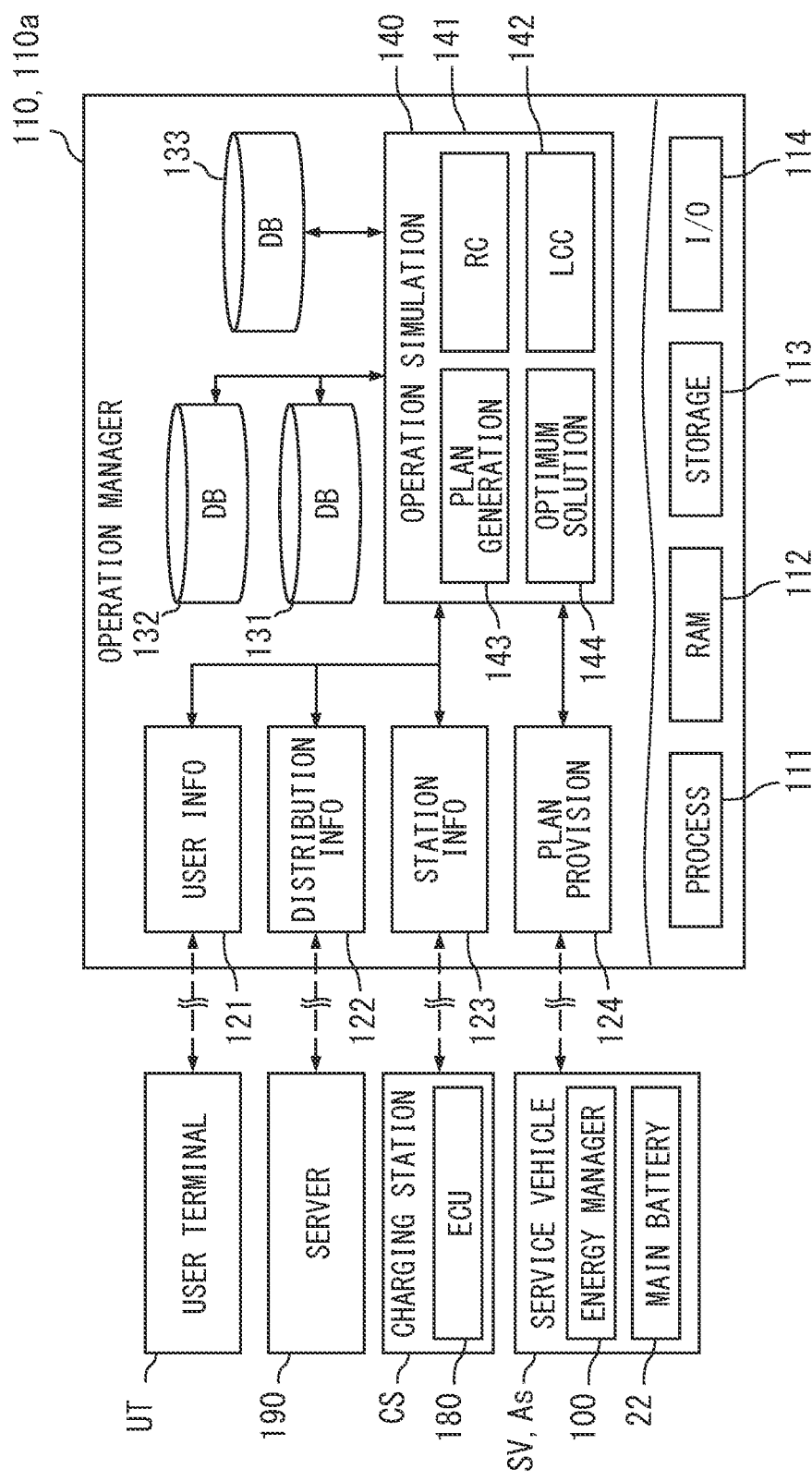
FIG. 2 is a block diagram showing a configuration of an operation manager.

As shown in FIG. 1 and FIG. 2, the operation management center CNT includes an operation manager 110. The operation manager 110 manages allocation of the service vehicles SV to the user U. The operation manager 110 generates an operation plan for each service vehicle SV for vehicle allocation management purpose. The operation manager 110 transmits the generated operation plan to each service vehicle SV through the network NW as a vehicle allocation instruction to the user U of the service vehicle SV.

The operation manager 110 is an arithmetic system mainly including at least one server device 110a. The server device 110a includes a processing unit 111, a RAM 112, a storage unit 113, an input output interface 114, a bus connecting these components. The processing unit 111 corresponds to a processor. The server device operates as the operation manager 110. The processing unit 111 is a hardware circuit combined with the RAM 112, and executes arithmetic processing. The processing unit 111 executes various processes related to vehicle allocation management and the like by accessing to the RAM 112. The storage unit 113 includes a non-volatile storage medium. Various programs (for example, vehicle allocation management program) to be executed by the processing unit 111 are stored in the storage unit 113.

The operation manager 110 includes multiple functional blocks that perform the vehicle allocation management method of the present disclosure by executing the vehicle allocation management program stored in the storage unit 113 by the processing unit 111. Specifically, the operation manager 110 includes, as the functional blocks, a user information acquisition unit 121, a distribution information acquisition unit 122, a station information acquisition unit 123, a plan provision approval unit 124, and an operation simulation unit 140, which are provided by the vehicle allocation management program.

The user information acquisition unit 121 acquires user information through the network NW and base stations BS. The user information is input to a user terminal UT by the user U who requests use of the mobility service. The user information includes at least ID information for identifying the user U, a boarding position and an alighting position of the user U, a scheduled boarding time (a scheduled boarding time zone), and the like. For example, the user U may use a smartphone, a tablet terminal, a personal computer, or the like as the user terminal UT to input the user information.

The user U can use the service vehicle SV for the purpose of delivering collected goods P at a specific place and at a specific time instead of simple travelling. The user information may include an expected alighting time (expected alighting time zone) in place of the scheduled boarding time or together with the scheduled boarding time. One user U can make the boarding reservation for multiple passengers. In this case, the user information further includes information indicating the number of passengers who plan to board the service vehicle SV.

The distribution information acquisition unit 122 acquires future information and power information through the network NW. Specifically, a cloud server 190 connected to the network NW collects the future information and the power information via the network, and distributes the collected information as the distribution information. The future information is used to estimate a demand for the service vehicles SV in the near future (in half a day or in one day from current time). Future information includes weather forecast information such as weather and temperature and event information indicating an event to be held in neighborhood where people gather. The power information is information related to electric power, more specifically, is information related to the electric power supplied to a charging station CS. The power information includes estimated information and current information about a power usage rate of a power plant that supplies power to a power grid, amount of power generated by a solar power generation system, and power loads of houses, office buildings, commercial buildings, factories, etc.

The station information acquisition unit 123 acquires station information through the network NW. The station information is related to the charging station CS installed in a specific area. The station information includes an installation location of the charging station CS, available time period of the charging station, a unit price of the electric power charge for charging service (hereinafter referred to as electric power unit price), and specification of the charging device. The specification information of the charging device includes information indicating whether quick charging is available, a corresponding charging standard, and a maximum output (kW) of quick charging. A station ECU 180 of each charging station CS provides the station information to the station information acquisition unit 123.

The charging station CS is an infrastructure facility for charging a main battery 22 of the service vehicle SV. The main battery 22 is a travelling purpose battery. Multiple charging stations CS are installed within a wide area to cover a service area where the mobility service is provided. The charging station CS may be installed in parking lots of public facilities, such as a shopping mall, a convenience store, or the like. The charging station CS charges the main battery 22 using the power supplied from the power plant through the power grid or the power supplied from a solar power generation system.

The multiple charging stations CS installed in a specific area may be managed by a station manager. The station manager is configured to communicate with the station ECU 180 through the network NW, and obtains the station information about each charging station CS within the specific area. When the station manager is provided, the station information acquisition unit 123 can acquire the respective station information of multiple charging stations CS from the station manager.

The plan provision approval unit 124 communicates information with each service vehicle SV through the network NW and the base station BS. The plan provision approval unit 124 acquires, from each service vehicle SV, vehicle state information indicating a current position of the service vehicle, information indicating whether the service vehicle is currently in user for delivering the user U or the goods P, a remaining battery level, and the like. The plan provision approval unit 124 provides the operation plan generated by the operation simulation unit 140 to each service vehicle SV.

The plan provision approval unit 124 acquires a modified operation plan from the service vehicle SV when the service vehicle SV generates the modified operation plan. The energy manager 100 mounted on the service vehicle SV may generate the modified operation plan by modifying a reference operation plan provided by the operation manager 110. When the plan provision approval unit 124 acquires the modified operation plan proposed by the energy manager 100 of the service vehicle, the plan provision approval unit 124 notifies the service vehicle SV, which is the proposal source, of a determination result indicating whether the proposed modified operation is approved or not.

The operation simulation unit 140 generates an operation plan for each service vehicle SV. The operation simulation unit 140 determines whether to approve the modified operation plan transmitted from each service vehicle SV. The operation simulation unit 140 prepares a vehicle allocation schedule and a charging schedule for all of the service vehicles SV in order to generate the operation plan and determine whether to approve the modified operation plan.

The operation simulation unit 140 may refer to information stored in a map information database 131, a past information database 132, and an operation plan database 133 for preparing the schedules. Each database 131, 132, 133 is an individual storage area assigned in the storage unit 113. The map information database 131 stores map information used for setting a travelling route of the service vehicle SV. The past information database 132 stores past information used for forecasting demand for the service vehicle SV. The past information records a correlation between past events and the demand tendency corresponding to the time of past event. The operation plan database 133 stores the operation plan transmitted to each service vehicle SV.

The operation simulation unit 140 includes, as functional blocks for preparing the vehicle allocation schedule and the charging schedule, a running cost estimation unit 141, a life cycle cost estimation unit 142, a plan generation unit 143, and an optimum solution calculation unit 144.

The running cost estimation unit (hereinafter also referred to as RC estimation unit) 141 calculates a running cost required for providing the allocation service to the user U. The running cost may be defined as a product of the electric power unit price for charging the main battery 22 and the amount of energy consumed by each service vehicle SV Hereinafter, the amount of energy consumed by each service vehicle SV is also referred to as power consumption, and has a unit of Wh or kWh. The RC estimation unit 141 sets the electric power unit price with reference to the power information and the station information. For example, when the electric power unit price is determined by a dynamic pricing, the RC estimation unit 141 sets the electric power unit price based on the electric power demand forecast. The RC estimation unit 141 estimates, based on the operation plan (operation plan draft) simulated by the plan generation unit 143, the energy consumption required for the service provision as the power consumption. The RC estimation unit 141 calculates the running cost associated with the service provision by multiplying the estimated power consumption by the set electric power unit price.

The life cycle cost estimation unit (hereinafter referred to as LCC estimation unit) 142 calculates the life cycle cost required for providing the allocation service to the user U.

The life cycle cost is substantially the cost of the main battery 22 mounted on the service vehicle SV. The main battery 22 is replaced when the SOH (states of health) decreases below a predetermined threshold value (hereinafter referred to as a replacement determination value). The SOH is a ratio of a fully charged capacity under a deteriorated state to a fully charged capacity under an initial state (unit: Wh or kWh). The LCC estimation unit 142 sets a cost per unit reduction amount of SOH (hereinafter, referred to as unit deterioration cost) based on a predetermined cost required for replacing the main battery 22 and the replacement determination value.

The LCC estimation unit 142 estimates, based on the travelling and charging plan according to the operation plan, a degree of performance deterioration of the main battery 22 of the service vehicle SV, that is, the reduction amount of the SOH. The storage unit 13 stores in advance a correlation information of the main battery 22 that indicates a relationship among a use condition, a charging condition, and the reduction amount of SOH. The correlation information is stored as a function or a table in the storage unit. The LCC estimation unit 142 refers to the correlation information and calculates the reduction amount of SOH corresponding to the use condition set in the operation plan. The LCC estimation unit 142 calculates the life cycle cost required for the service provision by multiplying the estimated reduction amount of SOH by the unit deterioration cost.

Figure 3:
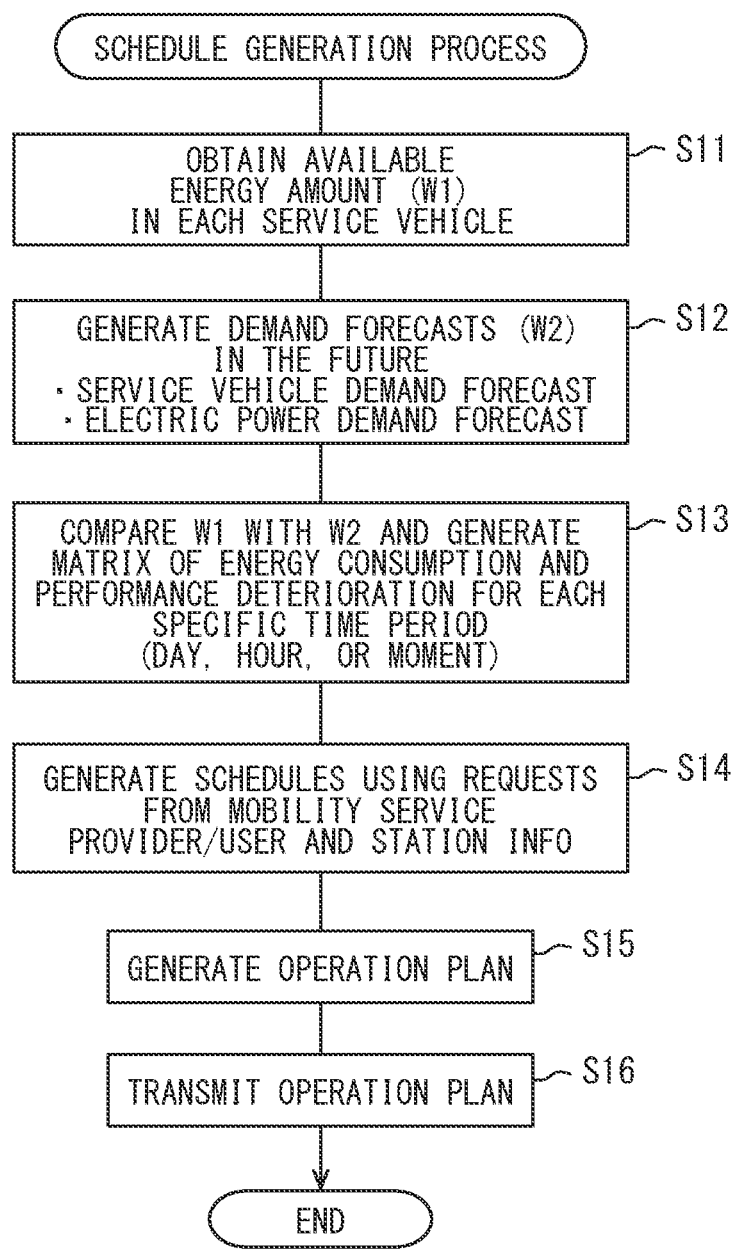
FIG. 3 is a flowchart showing details of a schedule generation process executed by a plan generation unit.

The plan generation unit 143 assembles the vehicle allocation schedule and the charging schedule that define operation contents of multiple service vehicles SV by executing a schedule generation process (refer to FIG. 3). The plan generation unit 143 generates each schedule to complete the mobility service required by the user U with sufficient electric power of the service vehicle SV based on and in consideration of the user information, the vehicle state information, the station information, the power information, or the like.

The vehicle allocation schedule defines which service vehicle SV needs to be directed to which boarding position or alighting position at what time along which traveling route and traveling speed of the service vehicle. The plan generation unit 143 generates the vehicle allocation schedule by referring to the map information stored in the map information database 131, and sets the travelling route of each service vehicle SV. The vehicle allocation schedule also includes a waiting schedule that waits for the service provision to the user after parking the service vehicle SV in a specific parking lot PS.

The charging schedule defines which service vehicle SV is to be charged to what charging level at what time by using which charging station CS. In the generation of the charging schedule, the plan generation unit 143 determines the charging station CS to which the service vehicle SV is directed in consideration of availability of the charging station indicated by the station information. The plan generation unit 143 further determines whether to perform a normal charging or a quick charging at the charging station CS, and further determines the states of charge (SOC) (of the main battery 22 as the charging target.

As described above, the plan generation unit 143 generates the vehicle allocation schedule and the charging schedule by assigning the highest priority to the completion of a use reservation received through the user terminal UT. The plan generation unit 143 calculates the vehicle allocation schedule and the charging schedule that maximize profits of a business provider of the mobility service by maximizing sales volume of the service provision and minimizing cost associated with the service provision.

The plan generation unit 143 predicts and acquires the demand forecast of the service vehicle SV using the user information, the future information, and the past information, etc. for the purpose of maximizing the sales volume and reducing opportunity loss. The plan generation unit 143 considers the estimated demand forecast and generates the charging schedule in order to meet the predicted demand of the service vehicle SV as much as possible.

As an example, when the weather forecast information such as temperature rise or rainfall or event schedule information in the vicinity is available as the future information, demand for service vehicle SV is expected to increase. In this case, the plan generation unit 143 generates the charging schedule so that the main battery 22 of each service vehicle SV is charged to a level close to the full charge state compared with usual state. The plan generation unit 143 generates the charging schedule so that the non-operating time (charging time) is decreased and the operating time is maximized by preferentially using the charging station CS capable of providing quick charging service.

As another example, the past information stores the past demand trend in relation to time information such as weekdays, holidays, and time zones, and also in relation to weather conditions such as weather and temperature. The plan generation unit 143 may predict the demand of the service vehicle SV based on the time information and the weather forecast information by referring to the past information. Based on the demand forecast, the plan generation unit 143 adjusts the charge state of the main battery 22 of each service vehicle SV so that sufficient service vehicles SV are secured at the time when the demand actually occurs.

For the purpose of minimizing the cost, the plan generation unit 143 generates the vehicle allocation schedule and the charging schedule in consideration of the running cost required for the service provision and the life cycle cost of the service vehicle SV associated with the service provision. The plan generation unit 143 adjusts each schedule using the cost as a common index so that the running cost calculated by the RC estimation unit 141 and the life cycle cost calculated by the LCC estimation unit 142 are suppressed most in total. The plan generation unit 143 adjusts the vehicle allocation schedule and the charging schedule so that the sum of the running cost and the life cycle cost generated by the multiple service vehicles SV are reduced in total.

The plan generation unit 143 assembles the vehicle allocation schedule and the charging schedule so that the total running cost (energy cost) generated in the multiple service vehicles SV is decreased. For example, based on the power information, the plan generation unit 143 avoids battery charging during the daytime in the summer when the power demand increases to the peak. The plan generation unit 143 may set the charging schedule so that the main battery 22 is charged in the midnight when the unit price of the electric power is low.

The plan generation unit 143 may generate the vehicle allocation schedule so that the travelling route of each service vehicle SV has a short distance in total, the travelling route can be travelled at a low speed, and the travelling route does not include an uphill section. The plan generation unit 143 assembles the vehicle allocation schedule and the charging schedule so that the service vehicle SV is charged when the service vehicle is located near the charging station CS.

The plan generation unit 143 determines whether to allow the performance deterioration of the main battery 22 based on the life cycle cost and cost base comparison of the life cycle cost. Performance deterioration of the main battery 22 is easily accelerated when charging or discharging of the main battery is performed at a high temperature and when the main battery 22 is left in the full charge state for a long time. Therefore, in order to suppress the acceleration of performance deterioration and reduce the life cycle cost, the plan generation unit 143 incorporates, in the charging schedule, deterioration reduction measures such as avoiding charging in a heat generated state and avoiding charging the battery to the full charge state. The plan generation unit 143 may incorporate, in the charging schedule, measures to avoid performance deterioration such as preferentially using the charging station CS in the shade, performing normal charging instead of quick charging, and completing charging immediately before a set departure time. The plan generation unit 143 may incorporate, in the vehicle allocation schedule, measures to avoid performance deterioration such as selecting a travelling route that can be traveled under a low travel load and avoiding traveling under a high load immediately before the start of battery charging.

The plan generation unit 143 generates the vehicle allocation schedule and the charging schedule for the entire service vehicles SV, and then generates the operation plan for each service vehicle SV based on the vehicle allocation schedules and the charging schedules of the entire service vehicles. The plan generation unit 143 provides each generated operation plan to the corresponding individual service vehicle SV through the plan provision approval unit 124. The plan generation unit 143 stores the operation plan provided to each service vehicle SV in the operation plan database 133 in a state of being associated with ID information of corresponding service vehicle SV. The ID information of service vehicle is information for identifying the corresponding service vehicle.

The plan generation unit 143 determines whether to approve the operation of the service vehicle SV based on the modified operation plan. When the modified operation plan is acquired by the plan provision approval unit 124, the plan generation unit 143 compares the operation plan stored in the operation plan database 133 with the acquired modified operation plan. The operation plan initially stored in the operation plan database 133 is also referred to as the reference operation plan. The plan generation unit 143 determines whether the entire vehicle allocation schedules and the charging schedules need to be revised based on the change of operation plan, that is, change from the reference operation plan to the modified operation plan. The plan generation unit 143 approves the change from the reference operation plan to the modified operation plan when the entire schedules are not substantially changed, that is, there is no substantial change in the operation plan of other vehicles. In this case, the plan generation unit 143 transmits, to the service vehicle SV that is the proposal source, a notification to approve the modified operation through the plan provision approval unit 124.

The following will describe details of a schedule generation process (refer to FIG. 3) executed by the plan generation unit 143. The plan generation unit 143 repeatedly executes the schedule generation process during a mobility service provision period.

In S11, the process obtains an amount of electric energy available in each service vehicle SV (hereinafter referred to as available energy amount W1) by acquiring the vehicle state information of each service vehicle SV, and the process proceeds to S12.

In S12, the process generates demand forecasts W2 in the future, and the process proceeds to S13. In S12, the demand forecast regarding the use of the service vehicle SV is performed using the user information, the past information, the future information, and the like. In S12, the demand forecast regarding the electric power consumption is further performed based on the electric power information. Among the demand forecasts W2, the demand forecast regarding the use of service vehicle SV is estimated information related to the energy consumed by the service vehicle SV, that is, the energy output from the service vehicle SV. The demand forecast regarding the electric power is estimated information related to the energy supplied to the service vehicle SV, that is, the energy input to the service vehicle SV.

In S13, based on the available energy amount W1 obtained in S11 and the demand forecasts W2 generated in S12, a matrix of energy consumption and performance deterioration is created for each specific time period such as one day, one hour, or predetermined time period shorter than one hour. Then, the process proceeds to S14. In S13, an energy amount required to be supplied to each service vehicle SV is obtained for each specific time period based on the available energy amount W1 in each service vehicle SV and the demand forecasts of the service vehicle SV. The running cost is estimated by multiplying the energy amount required to be supplied by the electric power unit price that reflects the electric power demand forecast. The life cycle cost associated with the performance degradation of the main battery 22 is estimated based on the energy amount required to be supplied for each specific time period.

In S14, the process generates the vehicle allocation schedule and the charging schedule according to the request of the mobility service operator, the request of the user U, and the station information. Specifically, in S14, the process sets a priority and priority level for the energy consumption and the performance deterioration based on the need of the business provider and the need of the user U. Then, based on the priority of energy consumption and the performance deterioration, the station information, and the above-mentioned matrixed cost related information, the process generates each schedule that balances running cost and the life cycle cost.

As an example, the plan generation unit 143 parameterizes the priority, the station information, and the matrixed cost related information, and applies these parameters to a predetermined function. The plan generation unit 143 adopts the vehicle allocation schedule and the charging schedule that minimize a value of the predetermined function. That is, the plan generation unit 143 adopts the vehicle allocation schedule and the charging schedule that meet the need of the business provider and the need of the user U.

In S15, the operation plan for each service vehicle SV is generated based on each schedule generated in S14, and the process proceeds to S16. In S16, the operation plan generated in S15 is transmitted to each service vehicle SV, and the schedule generation processing is terminated.

By executing an optimum solution calculation process (refer to FIG. 4), the optimum solution calculation unit 144 can calculate the optimum solution related to the charging station CS and the service vehicle SV which can efficiently increase profits for the mobility service business provider (operator). This optimal solution optimizes the energy consumption and the performance deterioration compared with a current state of the energy consumption and a current state of the performance deterioration. Herein, the optimization has substantially the same meaning as minimization of the running cost and minimization of the life cycle cost. The life cycle cost includes an investment cost of the service vehicle SV and the charging station CS.

Figure 4:
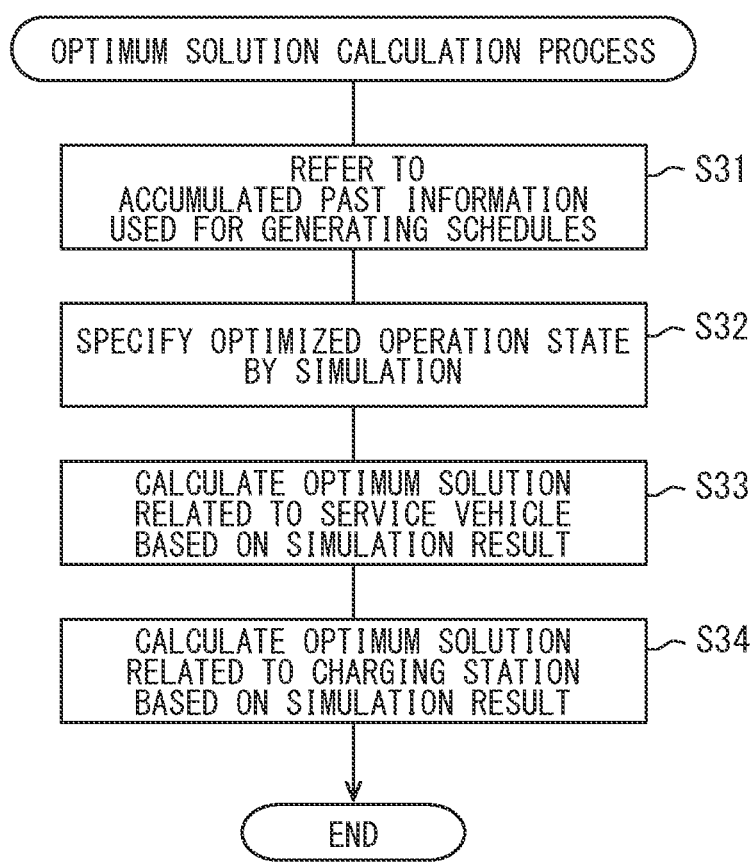
FIG. 4 is a flowchart showing details of an optimum solution calculation process executed by an optimum solution calculation unit.

The optimum solution calculation unit 144 refers to various accumulated information used for generating the vehicle allocation schedule and the charging schedule in order to calculate the optimum solution using the same information (refer to S31 of FIG. 4). Specifically, the accumulated information includes the running cost based on the energy consumption, the life cycle cost based on the performance deterioration of the main battery 22, demand forecasts, and the like. The optimum solution calculation unit 144 specifies, using the accumulated information referred to in the generation of schedules, an operating state capable of satisfying the demand of the user U with consideration of the demand forecast of electric power in a specific area, by a simulation method (refer to S32 of FIG. 4).

The optimum solution calculation unit 144 calculates the optimum solution related to the service vehicle SV based on the simulation result (refer to S33 of FIG. 4). Specifically, the optimum solution calculation unit 144 calculates an expected value for the number of service vehicles SV operated in the specific area, vehicle specifications, and the like. For example, the vehicle specification may include the allowable number of passengers and a capacity of the main battery 22.

The optimum solution calculation unit 144 calculates the optimum solution related to the charging station CS based on the simulation result (refer to S34 of FIG. 4). Specifically, the optimum solution calculation unit 144 calculates the optimum solution that can improve the current state of the charging device specification, such as the number of charging stations CS, position of each charging station CS, and availability of quick charging service in each charging station CS.

Figure 5:
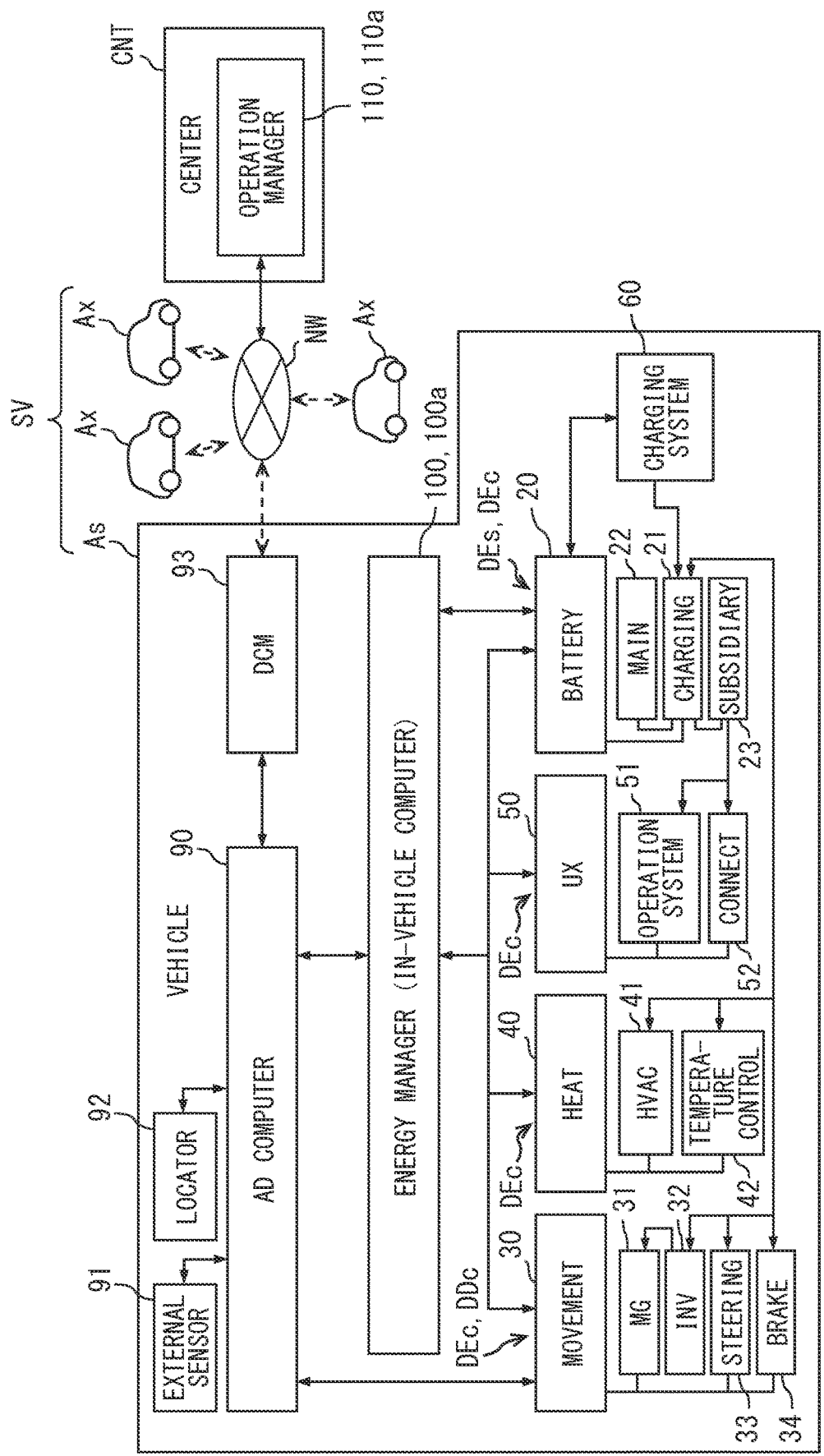
FIG. 5 is a block diagram showing an electric configuration of a service vehicle.
Figure 6:
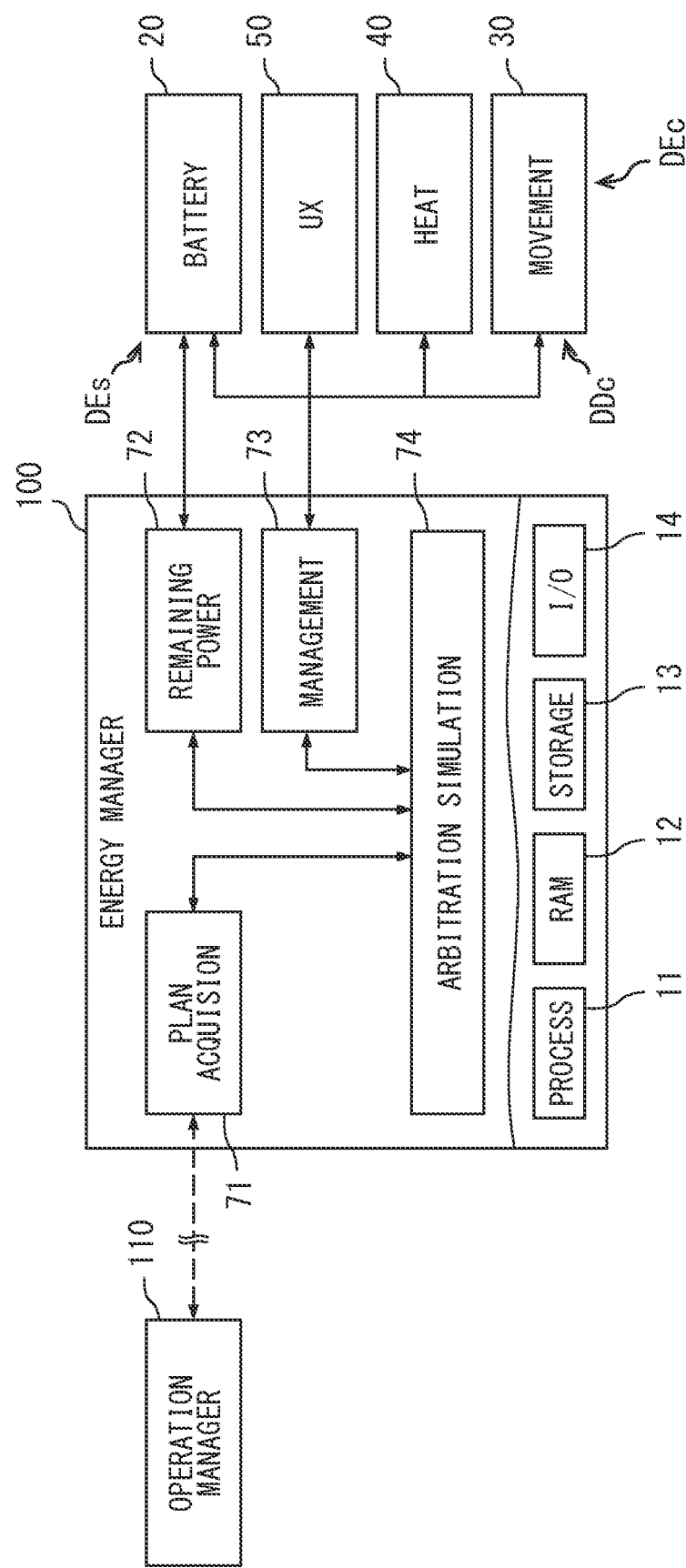
FIG. 6 is a block diagram showing a configuration of an energy manager.

The following will describe details of the service vehicle SV and travelling of the service vehicle SV which is managed by the above-described operation manager 110 with reference to FIG. 5 and FIG. 6.

A part of the multiple service vehicles SV are battery electric vehicles (BEV) each of which is equipped with travelling purpose main battery 22 and travels using the electric power supplied from the main battery 22. The service vehicle SV is an autonomous driving vehicle capable of autonomous driving without the driver's driving operation. The service vehicle SV may be a dedicated purpose vehicle used for the mobility service, or may be a fleet vehicle operated by the business provider. In the following description, one of the multiple service vehicles SV which is under the control of one specific operation manager 110 is referred to as a subject vehicle As for convenience. Remaining service vehicles SV other than the own vehicle As is referred to as a different vehicle Ax.

The subject vehicle As is equipped with an external sensor 91, a locator 92, a data communication module (DCM) 93, and an autonomous driving (AD) computer 90 as a configuration that performs the autonomous driving. In addition, the subject vehicle As is equipped with a charging system 60, multiple consumption domains DEc, a power supply domain DEs, and an energy manager 100.

The external sensor 91 detects moving objects such as pedestrians and other vehicles, as well as stationary objects such as curbs, road signs, road markings and lane markings on the road. For example, a camera device, a LIDAR, a millimeter wave radar, a sonar, or the like may be mounted on the subject vehicle as the external sensor 91.

The locator 92 has an antenna capable of receiving positioning signals from multiple positioning satellites of a satellite positioning system. The locator 92 measures the position of the subject vehicle As based on the received positioning signals.

The DCM 93 is a communication module mounted on the subject vehicle As. The DCM 93 transmits and receives radio waves to and from base stations BS (refer to FIG. 1) around the subject vehicle As by wireless communication under communication standards such as long term evolution (LTE) and 5G. By installing the DCM 93, the subject vehicle As can function as a connected car that can be connected to the network NW.

The AD computer 90 cooperates with the operation manager 110 to perform the autonomous driving of the subject vehicle As based on the operation plan. The AD computer 90 is an in-vehicle computer, and includes a processing unit, a RAM, a storage unit, an input/output interface, a bus connecting these components, and the like. The AD computer 90 acquires the operation plan transmitted from the operation manager 110 through the DCM 93. The AD computer 90 recognizes a traveling environment around the subject vehicle As based on object information acquired from the external sensor 91, position information acquired from the locator 92, and the like. Then, the AD computer generates a travelling route plan for driving the subject vehicle As according to the operation plan. The AD computer 90 calculates driving control amount, braking control amount, and steering control amount each of which is to be used for performing the autonomous driving along the travelling route plan, and generates a control command including the calculated control amounts. The AD computer 90 sequentially outputs the generated control command to a movement manager 30.

The consumption domains DEc includes multiple groups of in-vehicle devices that perform various vehicle functions by using electric power supplied by the main battery 22. In the present embodiment, a group of the in-vehicle devices include at least one domain manager and the consumption domains DEc whose power consumption is managed by the domain manager. The multiple consumption domains DEc include a travelling control domain DDc, an air conditioning control domain, and a user experience domain (hereinafter referred to as UX domain). driving control domain The travelling control domain DDc is one of the consumption domains DEc which controls travelling of the vehicle As. The travelling control domain DDc includes a motor generator 31, an inverter 32, a steering control system 33, a brake control system 34, and the movement manager 30.

The motor generator 31 is a driving power source that generates a driving force for travelling of the vehicle As. The inverter 32 controls applying of driving power and regeneration by the motor generator 31. The inverter 32 converts a DC power supplied from the main battery 22 into three-phase AC power, and supplies the three-phase AC power to the motor generator 31 while the motor generator 31 applies the driving power to the vehicle. The inverter 32 can adjust the frequency, current, and voltage of AC power, and can control the driving force generated by the motor generator 31. When the motor generator 31 is in the regeneration state, the inverter 32 converts AC power to the DC power, and supplies the DC power to the main battery 22 for charging purpose. The steering control system 33 controls a steering of the vehicle As. The brake control system 34 controls a braking force applied to the vehicle As.

The movement manager 30 is an in-vehicle computer electrically connected to the AD computer 90. The movement manager 30 acquires, from the AD computer 90, the control command indicating control amounts of driving, braking, and steering. The movement manager 30 integrally controls the inverter 32, the steering control system 33, and the brake control system 34 based on the control command, and controls the vehicle As to perform the autonomous driving along the travelling route plan.

The movement manager 30 functions as a domain manager of the travelling control domain DDc, and comprehensively manages the power consumed by each of the motor generator 31, the inverter 32, the steering control system 33, and the brake control system 34. The movement manager 30 acquires, from the energy manager 100, an instantaneous power usage upper limit of the travelling control domain DDc and a power consumption upper limit of the travelling control domain DDc during a specific period. The movement manager 30 controls the electric power and the electric power amount consumed by each control target so that the electric power and the electric power amount do not exceed the instantaneous power usage upper limit and the power consumption upper limit, respectively.

The air conditioning control domain is one of the consumption domains DEc which controls an air conditioning in the compartment of the vehicle As and a temperature of the main battery 22. The air conditioning control domain includes an heating, ventilation, air conditioning (HVAC) 41, a temperature control system 42, and a heat manager 40. Multiple HVACs 41 may be installed in one vehicle As.

The HVAC 41 is an electric air conditioning device that heats, cools, and ventilates the compartment of vehicle by using the electric power supplied from the main battery 22. The HVAC 41 includes a refrigeration cycle device, a blower fan, a heater, an air mix damper, and the like. The HVAC 41 controls a compressor of the refrigeration cycle device, the heater, the air mix damper, and the like to generate warm air that raises an air temperature outside of the vehicle or raises an air temperature in the compartment of the vehicle. The HVAC 41 also generates cool air by cooling the air. The HVAC 41 supplies, as conditioning air, the generated warm air or the cool air using the operation of the blower fan toward the compartment of the vehicle.

The temperature control system 42 increases or decreases the temperatures of the main battery 22, the motor generator 31, the inverter 32, and the like. The temperature control system 42 includes a cooling circuit, an electric pump, and a liquid temperature sensor. The cooling circuit includes pipes that are installed around each configuration of the electric traveling system such as the main battery 22, the motor generator 31, and the inverter 32. The electric pump circulates the coolant filled in the pipes of the cooling circuit. The liquid temperature sensor measures the temperature of the coolant. The temperature control system 42 maintains the temperature of the electric traveling system, which includes a high-voltage circuit, within a predetermined temperature range by circulating the coolant which is heated or cooled by the HVAC 41.

The heat manager 40 is an in-vehicle computer that controls an operation of the HVAC 41 and the temperature control system 42. The heat manager 40 compares a compartment temperature set by the air-conditioning system with a compartment temperature measured by a temperature sensor disposed in the compartment, and controls the air-conditioning operation of the HVAC 41 based on the comparison result. The heat manager 40 controls the temperature control operation of the HVAC 41 and the temperature control system 42 with reference to the measurement result by the liquid temperature sensor.

The heat manager 40 functions as a domain manager of heat domain, and comprehensively manages the power consumption by each of the HVAC 41 and the temperature control system 42. The heat manager 40 acquires, from the energy manager 100, an instantaneous power usage upper limit of the heat domain and a power consumption upper limit of the heat domain during a specific period. The heat manager 40 controls the electric power and the electric power amount consumed by the HVAC 41 and the temperature control system 42 so that the electric power and the electric power amount do not exceed the instantaneous power usage upper limit and the power consumption upper limit, respectively.

The user experience domain (hereinafter referred to as UX domain) is one of the consumption domains DEc that improves an experience of the user U of mobility service by keeping a comfortable state of the passenger compartment in which the user U is boarding. The UX domain includes in-vehicle devices related to human machine interface (HMI) system. The UX domain includes a cabin operation system 51, a connect system 52, and an UX manager 50.

The cabin operation system 51 includes an input interface, and the input interface includes an operation unit such as a touch panel, push buttons, or dials. The input interface receives an operation made on the operation unit by the user U who is in the vehicle compartment. For example, the cabin operation system 51 receives a user operation that changes air conditioning settings, a user operation that switches information presented by the connect system 52, or the like.

The connect system 52 includes an output interface, and the output interface includes a display panel for providing information to the user U in the vehicle compartment. The connect system 52 acquires news information, weather information, traffic information, video contents, and the like from the network NW through the DCM 93. The connect system 52 presents the information in push manner by displaying the acquired information on the display panel.

The UX manager 50 is an in-vehicle computer, and includes a processing unit, a RAM, a storage unit, an input/output interface, a bus connecting these components, and the like. The UX manager 50 functions as a domain manager of UX domain, and comprehensively manages the power consumption of each of the cabin operation system 51 and the connect system 52. The UX manager 50 acquires, from the energy manager 100, an instantaneous power usage upper limit of the UX domain and a power consumption upper limit of the UX domain during a specific period. The UX manager 50 controls the electric power and the electric power amount consumed by the cabin operation system 51 and the connect system 52 so that the electric power and the electric power amount do not exceed the instantaneous power usage upper limit and the power consumption upper limit, respectively.

The power supply domain DEs includes a group of in-vehicle devices for enabling power supply to the consumption domains DEc. Similar to each consumption domain DEc, the power supply domain DEs includes at least one domain manager. The power supply domain DEs of the vehicle As includes a charging circuit 21, the main battery 22, a subsidiary battery 23, and a battery manager 20.

The charging circuit 21 functions as, in cooperation with the battery manager 20, a junction box that integrally controls electric power flow between each consumption domain DEc and each battery 22, 23. The charging circuit 21 supplies electric power to other devices using the main battery 22 and the subsidiary battery 23, and charges the main battery 22 and the subsidiary battery 23 with electric power.

The main battery 22 is a secondary battery capable of charging and discharging electric power. The main battery 22 includes an assembled battery including multiple battery cells. For example, the battery cell may be provided by a nickel hydrogen battery, a lithium ion battery, an all-solid-state battery, or the like. The electric power stored in the main battery 22 is mainly used for traveling of the vehicle As, air conditioning in the vehicle compartment, temperature control of the electric traveling system, and the like.

Similar to the main battery 22, the subsidiary battery 23 is a secondary battery capable of charging and discharging electric power. For example, the subsidiary battery 23 may be provided by a lead storage battery. A battery capacity of the subsidiary battery 23 is smaller than a battery capacity of the main battery 22. The electric power stored in the subsidiary battery 23 is mainly used by auxiliary equipment of the vehicle As, such as the DCM 93, the cabin operation system 51, the connect system 52, and the like.

The battery manager 20 is an in-vehicle computer that functions as a domain manager of the power supply domain DEs. The battery manager 20 manages the power supplied from the charging circuit 21 to each consumption domain DEc. The battery manager 20 notifies the energy manager 100 of the remaining amount information about the main battery 22 and the subsidiary battery 23. In the power supply domain, that is, battery domain, electric power is consumed by the battery manager 20 or the like. Thus, the battery domain is also one of the consumption domains DEc.

The charging system 60 supplies power to the power supply domain DEs, and charges electric power to the main battery 22. An external charging device is electrically connected to the charging system 60 at the charging station CS (refer to FIG. 1). The charging system 60 outputs, to the charging circuit 21, the charging power supplied from the charging station through the charging cable. When performing normal charging, the charging system 60 converts the AC power supplied from the charging device for normal charging to DC power, and supplies the DC power to the charging circuit 21. When performing quick charging, the charging system 60 outputs, to the charging circuit 21, DC power supplied from the charging device for quick charging. The charging system 60 is configured to communicate with the charging device for quick charging, and controls the voltage supplied to the charging circuit 21 in cooperation with a control circuit of the charging device.

The charging system 60 may include an internal combustion engine as a range extender and a motor generator for power generation. This kind of charging system 60 can supply charging purpose electric power to the charging circuit 21 in response to a decrease in the remaining amount of the main battery 22 even when the charging system 60 is not connected to the charging device, for example, during a travelling state of the vehicle As.

The energy manager 100 manages the power usage by each consumption domain DEc in an integrated manner. The energy manager 100 is provided by a computer including a processing unit 11, a RAM 12, a storage unit 13, an input output interface 14, and a bus connecting these components. The processing unit 11 is a hardware combined with the RAM 12, and executes arithmetic processing. The processing unit 11 executes, by accessing the RAM 12, various processes for performing functions of functional blocks of the energy manager 100. The storage unit 13 includes a non-volatile storage medium. The storage unit 13 stores various programs (energy management program or the like) to be executed by the processing unit 11.

The energy manager 100 includes multiple functional blocks that execute an energy management method of the present disclosure by executing the program stored in the storage unit 13 using the processing unit 11. Specifically, the energy manager 100 includes, as the functional blocks, a plan acquisition proposal unit 71, a remaining power information acquisition unit 72, a management execution unit 73, and an arbitration simulation unit 74.

The plan acquisition proposal unit 71 acquires the operation plan transmitted from the operation manager 110. The operation plan defines a destination, waypoints, and an arrival time to each waypoint. The plan acquisition proposal unit 71 notifies the arbitration simulation unit 74 of the acquired operation plan.

When the arbitration simulation unit 74 generates the modified operation plan, the plan acquisition proposal unit 71 changes the initial operation plan (corresponding to the above-described reference operation plan) to the modified operation plan, and proposes the modified operation plan to the operation manager 110. The modified operation plan is an operation plan that is presumed to be able to suppress at least one of energy consumption or performance deterioration compared with the reference operation plan acquired from the operation manager 110. In some cases, the user U of the vehicle As (refer to FIG. 1) may have disadvantages when the reference operation plan is changed to the modified operation plan. In this case, the plan acquisition proposal unit 71 further acquires disadvantages of the user U from the arbitration simulation unit 74 as a trade-off condition, and transmits the acquired trade-off condition to the operation manager 110 together with the modified operation plan. For example, the trade-off conditions include a delayed arrival time to the destination or waypoint by a predetermined time period compared with the arrival time in the reference operation plan, a changed arrival order of the destination and the waypoints compared with the reference operation plan, and a use of travelling route which is easily congested.

When the plan acquisition proposal unit 71 proposes, to the operation manager 110, the modified operation plan and the trade-off condition, the plan acquisition proposal unit 71 further acquires a determination result indicating whether the operation manager 110 approves the modified operation plan or not. The plan acquisition proposal unit 71 notifies the arbitration simulation unit 74 of an approval/disapproval result of the modified operation plan.

The remaining power information acquisition unit 72 requests the battery manager 20 of the power supply domain DEs to provide remaining power information. The remaining power information acquisition unit 72 acquires, from the battery manager 20, the remaining power information of the power supply domain DEs. The remaining power information acquisition unit 72 acquires, as the remaining power information, an upper limit value of electric power stock and an upper limit value of electric power flow.

The remaining power information acquisition unit 72 acquires a value (hereinafter referred to as a remaining power value) indicating an amount of remaining power that can be supplied by the batteries 22 and 23 included in the power supply domain DEs. The remaining power value corresponds to the above-described available energy amount W1 (refer to S11 of FIG. 3). The battery manager 20 notifies the remaining power value to the remaining power information acquisition unit 72 using, for example, a numerical value having a unit of kWh. The remaining power information acquisition unit 72 acquires a value (hereinafter referred to as a maximum output value) indicating a maximum output that the power supply domain DEs can output to each consumption domain DEc. The battery manager 20 notifies the maximum output value to the remaining power information acquisition unit 72, for example, by a numerical value having a unit of kW.

The management execution unit 73 notifies the domain manager of each consumption domain DEc of the upper limit values set by the arbitration simulation unit 74. The upper limit values include an upper limit value of electric power amount consumed throughout the whole travelling under the operation plan (hereinafter referred to as a consumption upper limit value) and an upper limit value of instantaneous power use (hereinafter referred to as a usage upper limit value). The management execution unit 73 notifies, to each domain manager, the consumption upper limit value and the usage upper limit value of corresponding consumption domain DEc, and strictly requires each domain manager to observe the upper limit values.

The management execution unit 73 acquires, from each consumption domain DEc, a request for correcting the notified consumption upper limit value or the notified usage upper limit value, that is, a request for increasing the consumption upper limit value or the usage upper limit value (hereinafter referred to as further arbitration request). The management execution unit 73 acquires at least one of a required electric power amount or a required electric power required by the consumption domain DEc, which is the request source, from the domain manager as request information related to the further arbitration request. The value of the electric power amount acquired as the request information is a numerical value which has substantially the same unit (for example, kWh) as the consumption upper limit value notified to each domain manager and the remaining power value acquired by the remaining power information acquisition unit 72. Similarly, the value of the electric power acquired as the request information is a numerical value which has substantially the same unit (for example, kW) as the usage upper limit notified to each domain manager and the maximum output value acquired by the remaining power information acquisition unit 72. In multiple request information output by respective domain managers, the electric power amount values are generated to have substantially the same units, and the electric power values are generated to have substantially the same units. When the management execution unit 73 acquires the further arbitration request for increasing the upper limit values, the management execution unit 73 further acquires a reason for increasing the upper limit values from the domain manager.

The arbitration simulation unit 74 arbitrates the power consumption by each of the consumption domains DEc based on the operation plan and the remaining power information. The arbitration simulation unit 74 individually sets the consumption upper limit value of each consumption domain DEc and limits power consumption by each consumption domain DEc so that a total amount of electric power consumed by multiple consumption domains DEc during the travelling of vehicle under the operation plan does not exceed the above-described remaining power value. The arbitration simulation unit 74 individually sets the usage upper limit value of each consumption domain DEc and limits power consumption by each consumption domain DEc so that a total power usage of multiple consumption domains DEc does not exceed the maximum output value.

The arbitration simulation unit 74 calculates a reference total electric power amount consumed by multiple consumption domains DEc during the traveling of vehicle based on the reference operation plan. The arbitration simulation unit 74 calculates a degree of performance deterioration (hereinafter referred to as a reference performance deterioration) in the main battery 22 caused by the travelling based on the reference operation plan. The arbitration simulation unit 74 attempts to generate the modified operation plan such that the total amount of electric power consumed by multiple consumption domains DEc is smaller than the reference total electric power amount or the performance deterioration of the main battery 22 can be suppressed at a degree smaller than the reference performance deterioration. When the arbitration simulation unit 74 succeeds to generate the modified operation plan, the arbitration simulation unit 74 further generates a trade-off condition including deterioration caused by the change from the reference operation plan to the modified operation plan. The arbitration simulation unit 74 correlates the trade-off condition to the modified operation plan, and notifies the modified operation plan to the operation manager 110 which is the providing source of the reference operation plan.

When the management execution unit 73 receives the further arbitration request from the consumption domain DEc, the arbitration simulation unit 74 executes a further arbitration simulation for adjusting the consumption upper limit value and the usage upper limit value set for each consumption domain DEc. The arbitration simulation unit 74 determines whether the further arbitration simulation is necessary according to content of a request reason acquired by the management execution unit 73. The arbitration simulation unit 74 determines whether to adjust the upper limit values based on importance and urgency of the request reason and the remaining power information of the main battery 22.

As an example, the travelling control domain DDc outputs an emergency request as the further arbitration request when an emergency avoidance movement is necessary to be carried out by the vehicle As. The emergency request is associated with request information requesting a temporary deactivation of the usage upper limit value. When the emergency request is acquired by the management execution unit 73, the arbitration simulation unit 74 increases the usage upper limit value of the travelling control domain DDc to a maximum level such that the control executed by the movement manager 30 to avoid the emergency situation is not hindered by the limit of the supplied power. As described above, the power supply to the travelling control domain DDc is prioritized among the multiple consumption domains DEc so that the movement manager 30 can surely execute the emergency avoidance movement. In this case, the usage upper limit value of another consumption domain DEc other than the travelling control domain DDc is decreased compared with a usual state.

Figure 7:
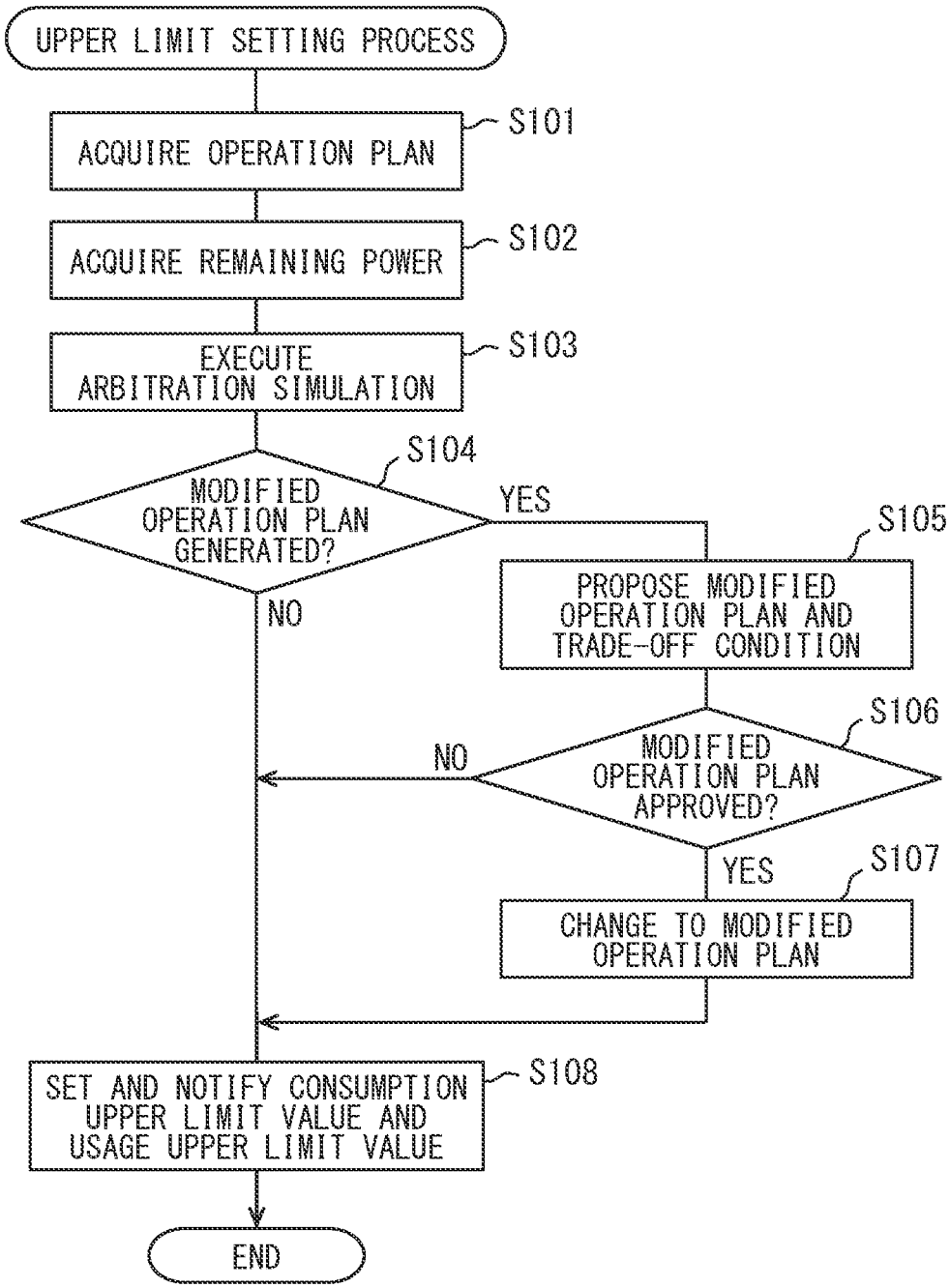
FIG. 7 is a flowchart showing details of an upper limit setting process executed by the energy manager.

The following will describe details of an upper limit setting process executed by the energy manager 100 with reference to FIG. 7. In the description of the upper limit setting process, the configurations shown in FIG. 5 and FIG. 6 may be referred. The upper limit setting process shown in FIG. 7 is started in response to a new operation plan being received by the vehicle As.

In S101 of the upper limit setting process, the energy manager acquires, as the reference operation plan, a latest operation plan transmitted from the operation manager 110, and the process proceeds to S102. In S102, latest remaining power information is acquired from the battery manager 20, and the process proceeds to S103. In S103, the arbitration simulation is performed using the operation plan acquired in S101 and the remaining power information acquired in S102, and the process proceeds to S104.

In S104, the energy manager determines whether the modified operation plan, which can suppress at least one of the energy consumption or the performance deterioration compared with the operation plan acquired in S101, is generated in the arbitration simulation of S103. When the energy manager determines in S104 that the modified operation plan is not generated, the process proceeds to S108. In this case, the operation of the vehicle is carried out based on the operation plan transmitted from the operation manager 110. When the energy manager determines in S104 that the modified operation plan is generated, the process proceeds to S105.

In S105, the modified operation plan generated in S103 and related trade-off condition are proposed to the operation manager 110, and the process proceeds to S106. In S106, the energy manager determines whether the modified operation plan proposed in S105 is approved by the operation manager 110. As an example, when a notification indicating approval of the change to the modified operation plan is received within a predetermined time period after the transmission of the modified operation plan, the energy manager determines in S106 that the modified operation plan is approved by the operation manager 110. Then, the process proceeds to S107. In S107, the reference operation plan is replaced by the modified operation plan, and the process proceeds to S108.

When a notification indicating disapproval of the change to the modified operation plan is received or the notification indicating approval of the change to the modified operation plan is not received within the predetermined time period, the energy manager determines in S106 that the modified operation plan is not approved by the operation manager 110. Then, the process proceeds to S108.

In S108, the consumption upper limit value and the usage upper limit value of each consumption domain DEc are set based on the reference operation plan or the modified operation plan finally adopted as a target operation plan. Then, each upper limit value is notified to the corresponding domain manager, and the upper limit setting process is terminated.

Figure 8:
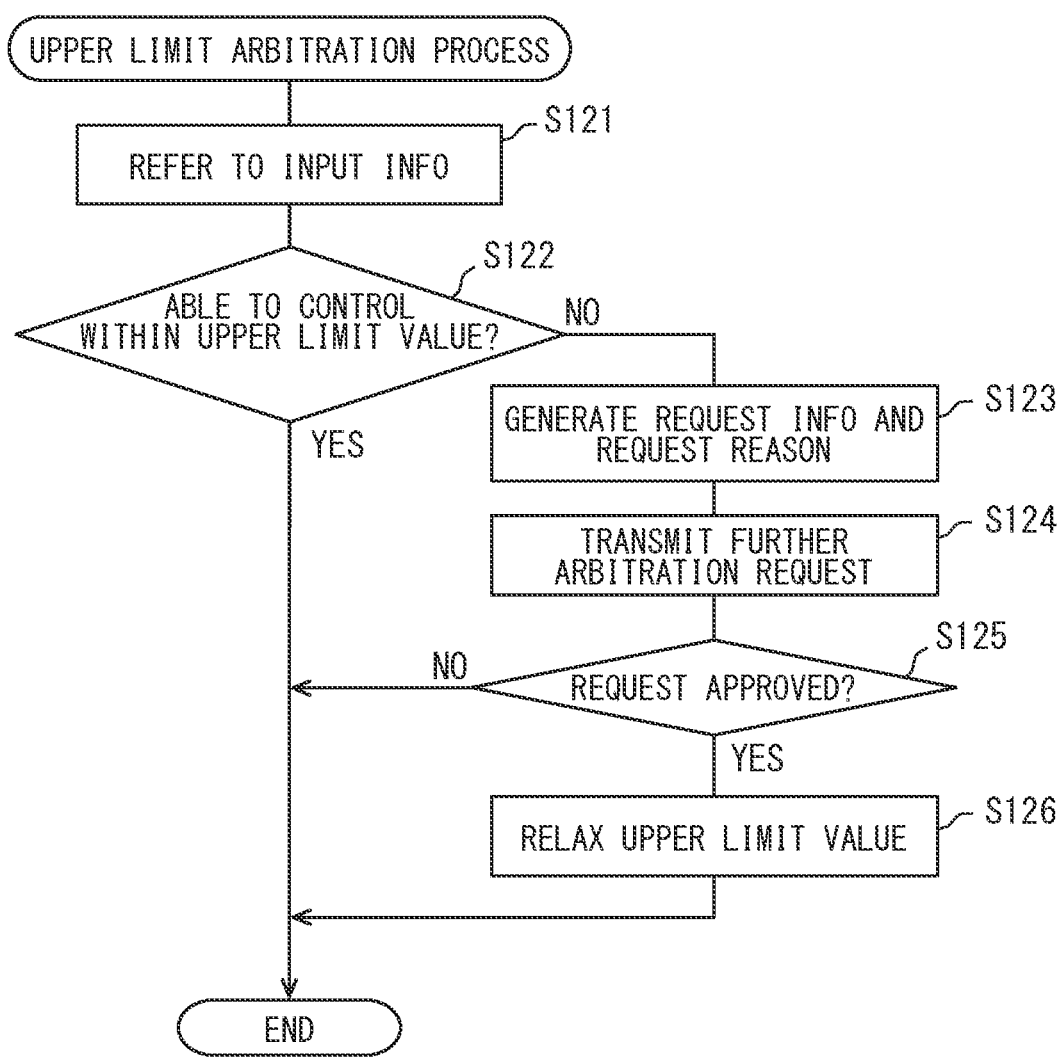
FIG. 8 is a flowchart showing details of an upper limit arbitration process executed by a domain manager of consumption domains.
Figure 9:
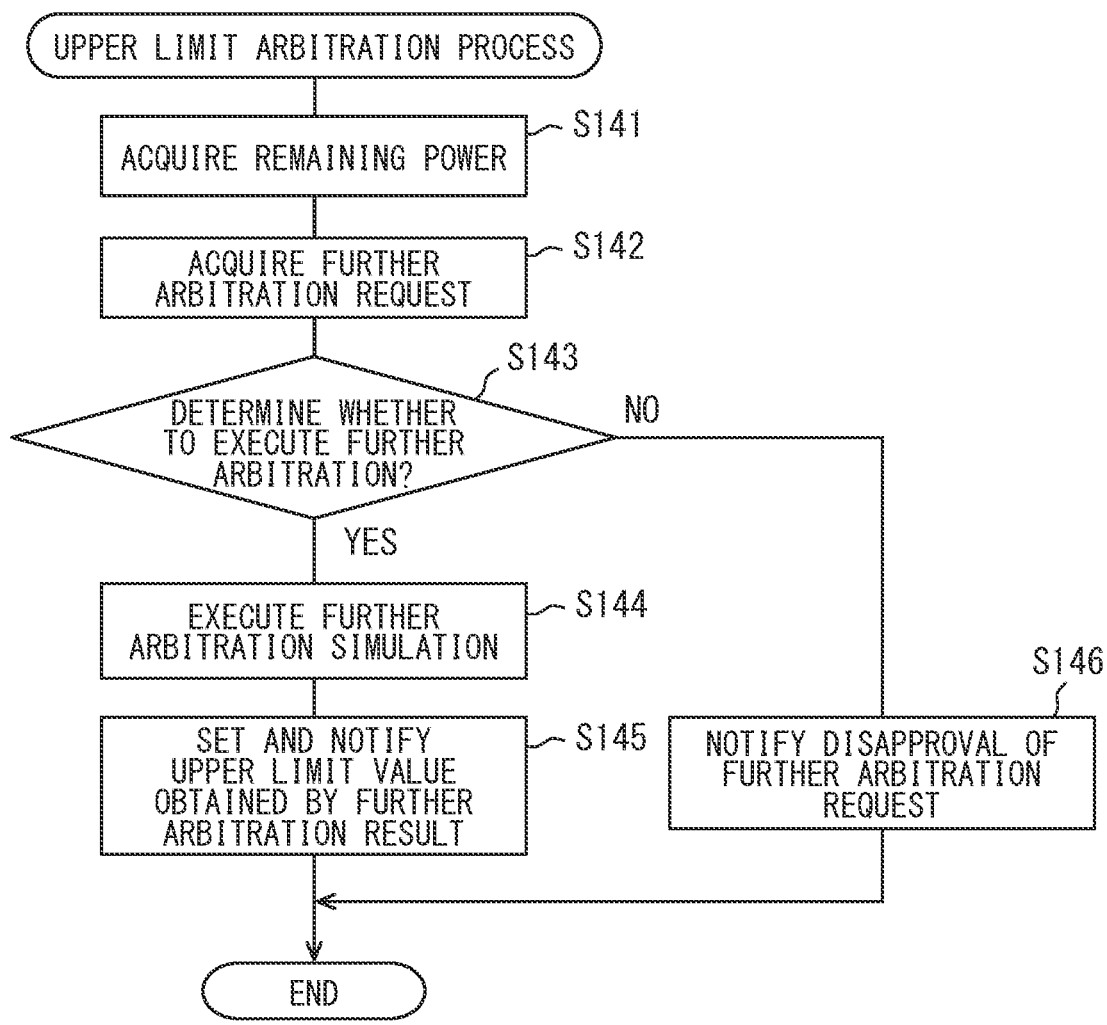
FIG. 9 is a flowchart showing details of an upper limit arbitration process executed by the energy manager.

The following will describe details of an upper limit arbitration process executed by each domain manager and the energy manager 100 in cooperation manner with reference to FIG. 8 and FIG. 9. In the description of the upper limit arbitration process, the configurations shown in FIG. 5 and FIG. 6 may be referred. During execution of the vehicle operation based on the operation plan, the upper limit arbitration processes shown in FIG. 8 and FIG. 9 are executed by the corresponding managers in repeated manner.

The upper limit arbitration process shown in FIG. 8 is executed by each domain manager. In S121 of the upper limit arbitration process, the domain manager refers to input information related to corresponding consumption domain DEc, and the process proceeds to S122. The input information in one consumption domain DEc is different from one another. As an example, in the travelling control domain DDc, the control command generated by the AD computer 90 corresponds to the input information. The input information of the travelling control domain DDc may also include an operation command for emergency avoidance movement. In the air conditioning control domain, an operation command for changing a set temperature of the air conditioning in the compartment corresponds to the input information.

In S122, the domain manager determines whether the control in response to the input information referred to in S121 can be executed without exceeding a current consumption upper limit value and a current usage upper limit value that are set by the energy manager 100. In S122, when determining that the control can be executed within each upper limit value, the upper limit arbitration process is terminated. In this case, the consumption domain DEc executes the control corresponding to the input information within the ranges of the currently set upper limit values.

In S122, when determining that there is a possibility of exceeding at least one of the consumption upper limit value or the usage upper limit value, the process proceeds to S123. In S123, the domain manager generates request information which requests electric power amount and electric power necessary for the control. In S123, the domain manager also generates the request reason for relaxing the upper limit values. Then, the process proceeds to S124. As an example, the movement manager 30 that receives the operation command for emergency avoidance movement determines that the necessary usage power may exceed the usage upper limit value. In this case, the movement manager 30 generates the request information that requests an increase of the usage upper limit value to the maximum level.

In S124, the domain manager transmits, to the energy manager 100, the further arbitration request including the request information and the request reason generated in S123, and the process proceeds to S125. In S125, the domain manager determines whether the further arbitration request transmitted in S124 is approved by the energy manager 100. As an example, in S125, when a notification indicating approval of the upper limit relaxation is obtained within a predetermined time period after transmission of the further arbitration request, the domain manager determines that the further arbitration request is approved, and the process proceeds to S126. In S126, at least one of the consumption upper limit value or the usage upper limit value is relaxed, that is, increased according to the content approved by the energy manager 100, and the upper limit arbitration process is terminated. In this case, the consumption domain DEc executes the control corresponding to the input information within the ranges of the relaxed upper limit values, that is, increased upper limit values.

In S125, when a notification indicating disapproval of the upper limit relaxation is obtained or the notification indicating approval of the upper limit relaxation is not received within the predetermined time period, the domain manager determines that the further arbitration request is not approved, and the upper limit arbitration process is terminated. In this case, the consumption domain DEc executes the control corresponding to the input information within the ranges of the currently set upper limit values. As a result, a shortage of travelling power or a shortage of air conditioning power may occur.

The upper limit arbitration process shown in FIG. 9 is executed by the energy manager 100. In S141 of the upper limit arbitration process, the latest remaining power information is acquired from the battery manager 20, and the process proceeds to S142. In S142, the energy manager acquires the further arbitration request (refer to S124 of FIG. 8) transmitted from the domain manager, and obtains the upper limit value indicated by the request information and the reason for the request. Then, the process proceeds to S143. When there is no further request information transmitted from the domain manager, the upper limit arbitration process is terminated.

In S143, the energy manager determines whether to execute the arbitration of at least one of the consumption upper limit value or the usage upper limit value again with reference to the request information and the reason for the request acquired in S142. As an example, when a highly urgent request reason such as emergency avoidance is notified by the domain manager, the energy manager determines in S143 that a further arbitration is necessary. As another example, when the remaining power indicated by the remaining power information has a sufficient margin with respect to the requested upper limit value, the energy manager determines in S143 execution of a further arbitration (allow the further arbitration). When determining execution of the further arbitration in S143, the process proceeds to S144.

In S144, after adjusting the priority of the power supply based on the reason for the request, the energy manager simulates the further arbitration, and the process proceeds to S145. In S145, at least one of the consumption upper limit value or the usage upper limit value is set based on the further arbitration result which is obtained by the simulation result of S144. Then, a new upper limit value is sent to the domain manager that requested the further arbitration as a notification indicating approval of the further arbitration request. Then, the current upper limit arbitration process is terminated.

When determining non-execution of the further arbitration in S143, the process proceeds to S146. In S146, a notification indicating disapproval of the further arbitration request is transmitted to the domain manager which requested the further arbitration, and the upper limit arbitration process is terminated.

In the present embodiment described above, the operation plan provided to the service vehicle SV considers not only the energy consumption generated in response to the service provision but also the performance deterioration of the service vehicle SV. Thus, the operation of the service vehicle SV according to an operation plan that worsens the performance deterioration can be avoided. Thus, an increase in life cycle cost of the service vehicle SV can be suppressed. This configuration can provide vehicle allocation management which is highly convenient for mobility service provider.

In the present embodiment, the running cost based on energy consumption is compared with the life cycle cost based on performance deterioration, and the operation plan capable of suppressing a total cost of the running cost and the life cycle cost is preferentially adopted. By balancing the energy consumption and performance deterioration based on the cost, the profit of the service provider can be easily secured.

In the present embodiment, the operation plan is generated with consideration of energy consumption and performance deterioration of multiple service vehicles SV. Therefore, the operation manager 110 can operate the service vehicles SV under the vehicle allocation management in cooperation manner with one another. Thus, operation efficiency can be further improved. In the present embodiment, the vehicle allocation management can further reduce the cost associated with service provision.

In the present embodiment, the energy manager 100 of the service vehicle SV can generate the modified operation plan presumed to be able to further suppress performance deterioration compared with the reference operation plan provided by the operation manager 110. The energy manager 100 proposes, to the operation manager 110, a change of the reference operation plan to the modified operation plan. The operation manager 110 determines whether to approve travelling of the vehicle based on the modified operation plan.

According to the above arbitration process, the operation plan of each service vehicle SV can be adjusted to suppress performance deterioration of the main battery 22 with consideration of individual situation of each service vehicle SV under a condition that there is no substantial change in the vehicle allocation schedule and the charging schedule. As a result, the performance deterioration of the service vehicle SV, that is, the life cycle cost can be further reduced.

In the present embodiment, the vehicle allocation schedule and the charging schedule are generated in consideration of the demand forecast of the service vehicles SV. As a result, the operation plan provided to the service vehicle SV is generated with consideration of the demand forecast. According to this configuration, an occurrence of situation where the mobility service required by the user U cannot be provided can be reduced. By reducing such opportunity loss, the sales of mobility services can be efficiently increased.

In the present embodiment, the vehicle allocation schedule and the charging schedule are generated in consideration of the station information provided by the charging station CS. Thus, the operation plan provided to the service vehicle SV is generated with consideration of the availability of charging station CS, the charging device specifications, and the like. According to this configuration, charging under the charging schedule can be performed in each service vehicle SV. As a result, the operation of the service vehicles SV according to the vehicle allocation schedule can be executed with high reliability.

In the present embodiment, the electric power information is reflected in the generation of the vehicle allocation schedule and the charging schedule. Thus, the operation plan of each service vehicle SV is generated with consideration of the electric power information. With this configuration, the running cost associated with the service provision can be further reduced by suppressing the unit price of electric power at the time of charging. As a result, the profit of the mobility service can be efficiently increased.

In the present embodiment, each optimum solution for the charging station CS and the service vehicle SV is calculated in consideration of energy consumption and performance deterioration, that is, running cost and life cycle cost. Specifically, the optimum solution calculation unit 144 calculates the optimum solution that reduces cost and increases profit with respect to the number of charging stations CS, the positions of charging stations, and the specifications of the charging function. The optimum solution calculation unit 144 calculates the optimum solution that increases the profit with respect to the number of service vehicles SV and the performance specifications of the service vehicles. As described above, the operation manager 110 is able to acquire an improvement policy from the accumulated information obtained through vehicle allocation management. Thus, the operation manager 110 can provide the mobility service provider with even higher convenience.

In the present embodiment, the server device 110a corresponds to a computer, and the server device 110a or the operation manager 110 corresponds to a vehicle allocation management device. The processing unit 111 corresponds to a processor, the RC estimation unit 141 corresponds to a consumption estimation unit, the LCC estimation unit 142 corresponds to a deterioration estimation unit, and the main battery 22 corresponds to a battery for traveling purpose.

Other Embodiments

Although one embodiment of the present disclosure has been described above, the present disclosure is not construed as being limited to the above-described embodiments, and can be applied to various embodiments and combinations within a scope that does not depart from the spirit of the present disclosure.

The energy manager 100 of the above embodiment is provided by the in-vehicle computer 100a of the service vehicle SV. Alternatively, the function of the energy manager 100 may be provided not only by the in-vehicle computer 100a on the vehicle side but also by a computer provided on the network NW or provided on the cloud (for example, the server device 110a).

The operation manager 110 of the above embodiment generates the operation plan of each service vehicle SV in consideration of energy consumption and performance deterioration of the entire service vehicles SV under control. In a first modification, the operation manager 110 may generate an operation plan of each service vehicle by optimizing a balance between the energy consumption and the performance deterioration in each service vehicle SV.

In a second modification, the arbitration process executed by the energy manager 100 and the operation manager 110 may be omitted. Therefore, the energy manager 100 omits the function of proposing the modified operation plan. The operation manager 110 omits the function of approving the modified operation plan. In a third modification, the energy manager 100 may have a function of proposing the modified operation plan, but does not have a function of notifying the trade-off condition.

In a fourth modification, the operation manager 110 may not consider at least one of the demand forecast, the station information, or the electric power information of the service vehicle SV in a generation of the operation plan In a fifth modification, the operation manager 110 may not include the optimum solution calculation unit 144. Thus, the operation manager 110 does not propose the optimum solution of the charging station CS and the service vehicle SV in the fifth modification.

The service vehicle SV may be a cargo-only vehicle that does not have the compartment for the user U to board. The service vehicle SV may be a vehicle having a cargo space for accommodating only the goods P, in addition to the compartment for the user to board. The service vehicle SV does not have to be an autonomous driving vehicle, and may be a semi-autonomous driving vehicle that is remotely controlled by an operator stationed at an operation management center CTo under specific conditions. The service vehicle SV may be a personally owned vehicle (POV) registered in the operation manager 110 instead of the fleet vehicle as described in the above embodiment. In such a service vehicle SV, the driver drives the vehicle based on the operation plan transmitted from the operation manager 110.

The specifications of the service vehicle SV, such as the vehicle size and the passenger capacity may be properly changed as appropriate. Service vehicles SV having different specifications from one another may be operated by one operation manager 110. The service vehicle SV may be a large size vehicle such as an eight-wheeled vehicle or a six-wheeled vehicle which has an increased capacity of the main battery 22 and increased passenger capacity.

In the foregoing embodiments, the respective functions provided by the in-vehicle computer 100a or the server device 110a may be provided by software or hardware for executing the software. Specifically, the in-vehicle computer 100a or the server device 110a may be provided by only software, only hardware, or a combination of the software and hardware. In cases where functions are provided by electronic circuits as hardware, the functions can be also provided by analog circuits or digital circuits which include a large number of logic circuits.

In the foregoing embodiments, the processing unit 11, 111 may include at least one operational core, such as a central processing unit (CPU) or a graphics processing unit (GPU). The processing unit 11, 111 may further include a field-programmable gate array (FPGA) and an IP core having other dedicated functions.

The main battery 22 corresponds to a battery. The processing unit 111 corresponds to a processor, the RC estimation unit 141 corresponds to a consumption estimation unit, the LCC estimation unit 142 corresponds to a deterioration estimation unit, the operation manager 110 corresponds to a vehicle allocation management device, and the server device 110a corresponds to a computer or the vehicle allocation management device.

In the above embodiments, a storage medium adopted as the storage unit 13 and 113 that stores the program for executing the charging management method may be properly changed. For example, the storage medium is not limited to the configuration provided on the circuit board, and may be provided in the form of a memory card or the like. The storage medium may be inserted into a slot portion, and electrically connected to the computer bus. The storage medium may be provided by an optical disk which includes a program source to be copied into a computer, a hard disk drive, or the like.

The processing unit and the method thereof which have been described in the present disclosure may be also implemented by a special purpose computer which includes a processor programmed to execute one or more functions implemented by computer programs. Alternatively, the device and the method described in the present disclosure may be implemented by a special purpose hardware logic circuit. Alternatively, the device and the method described in the present disclosure may be implemented by one or more special purpose computers configured by a combination of a processor executing a computer program and one or more hardware logic circuits. The computer program may also be stored in a computer-readable non-transitory tangible recording medium as instructions to be executed by a computer.

It is noted that a flowchart or the process of the flowchart in the present disclosure includes multiple steps (also referred to as sections), each of which is represented, for example, as S11. Further, each step can be divided into several sub-steps while several steps can be combined into a single step.

In the above embodiments, the configurations, the aspects of the vehicle allocation management device and vehicle allocation management method according to the present disclosure are exemplified. The present disclosure is not limited to the above-described embodiments, each configuration and each aspect related to the present disclosure. For example, embodiments, configurations, and examples obtained from an appropriate combination of technical elements disclosed in different embodiments, configurations, and examples are also included within the scope of the embodiments, configurations, and examples of the present disclosure.

What is claimed is:

1. A vehicle allocation management method executed by a computer to manage service vehicles used in a mobility service to a user, the service vehicles configured to be autonomously controlled, the vehicle allocation management method comprising instructions to be executed by at least one processor, the instructions comprising:

estimating, as an energy consumption, an electric power consumption required that is generated in response to a service provision to the user;

estimating a performance deterioration in a main battery of a service vehicle associated with the service provision to the user, the performance deterioration indicating a deterioration in a life cycle of the main battery;

calculating a running cost required for the service provision by multiplying the estimated electric power consumption by an electric power unit price;

calculating a life cycle cost of the service vehicle by calculating a performance reduction amount in the main battery mounted on the service vehicle corresponding to the estimated power consumption and indicating a reduction amount in the life cycle of the main battery;

generating a reference operation plan to be provided to the service vehicle such that a sum of the running cost and the life cycle cost is minimized in total;

calculating, in the service vehicle, a reference total electric power amount consumed by multiple consumption domains during a traveling of the service vehicle based on the reference operation plan;

calculating, in the service vehicle, a reference performance deterioration in the main battery of the service vehicle caused by the travelling based on the reference operation plan;

generating, in the service vehicle, a modified operation plan such that a total amount of electric power consumed by the multiple consumption domains is smaller than the reference total electric power amount and the performance deterioration of the main battery is smaller than the reference performance deterioration;

in response to the modified operation plan being generated, further generating a trade-off condition, which is correlated to the modified operation plan and includes deterioration caused by a change from the reference operation plan to the modified operation plan;

providing the modified operation plan and the trade-off condition to a generation source of the reference operation plan;

obtaining, from the service vehicle, the modified operation plan together with the trade-off condition of the modified operation plan;

determining, based on the trade-off condition of the modified operation plan, whether to approve an operation of the service vehicle under the modified operation plan obtained from the service vehicle;

in response to determining to approve the operation of the service vehicle under the modified operation plan, setting a consumption upper limit value and a usage upper limit value of each consumption domain of the service vehicle based on the modified operation plan; and transmitting, to the service vehicle, a notification to approve the modified operation plan in response to the operation being approved, which operates the service vehicle based on the modified operation plan; and autonomously controlling the service vehicle based on the modified operation plan.

2. The vehicle allocation management method according to claim 1, further comprising generating an operation plan to be provided to each of remaining service vehicles other than the service vehicle with consideration of an energy consumption by an entire fleet of service vehicles and a performance deterioration of the entire fleet of service vehicles.

3. The vehicle allocation management method according to claim 1, wherein
the modified operation plan is generated with consideration of a demand forecast of the service vehicles.

4. The vehicle allocation management method according to claim 1, wherein
the modified operation plan is generated with consideration of station information related to a charging station which charges the main battery for travelling purpose mounted on the service vehicle.

5. The vehicle allocation management method according to claim 4, wherein
the modified operation plan is generated with consideration of electric power information related to electric power supply to the charging station.

6. The vehicle allocation management method according to claim 4, further comprising
calculating an optimum solution that optimizes the energy consumption and the performance deterioration with respect to at least one of a quantity of charging stations, positions of the charging stations, or charging specifications of the charging stations.

7. The vehicle allocation management method according to claim 1, further comprising
calculating an optimum solution that optimizes the energy consumption and the performance deterioration with respect to at least one of a quantity of the service vehicles under operation or performance specifications of the service vehicles.

8. The vehicle allocation management method according to claim 1, further comprising
in response to determining to not approve the operation of the service vehicle under the modified operation plan, setting a consumption upper limit value and a usage upper limit value of each consumption domain of the service vehicle based on the modified operation plan.

9. The vehicle allocation management method according to claim 1, wherein
the trade-off condition of the modified operation plan includes at least one of (i) a delayed arrival time to a destination or waypoint by a predetermined time period in the modified operation plan compared with an arrival time in the modified operation plan, (ii) a changed arrival order of the destination and the waypoint in the modified operation plan compared with the modified operation plan, (iii) or a use of travelling route which is easily congested.

10. The vehicle allocation management method according to claim 1, wherein
the consumption upper limit value and the usage upper limit value of each consumption domain of the service vehicle are set based on the modified operation plan limits power consumption by each consumption domain of the service vehicle such that a total power usage of multiple consumption domains of the service vehicle does not exceed the maximum output value.

11. A vehicle allocation management program product that manages an allocation of service vehicles used in a mobility service to a user, the service vehicles configured to be autonomously controlled, the vehicle allocation management program product being stored in a non-transitory tangible recording medium as instructions to be executed by a computer, the instructions comprising:
estimating, as an energy consumption, an electric power consumption required that is generated in response to a service provision to the user;
estimating a performance deterioration in a main battery of a service vehicle associated with the service provision to the user, the performance deterioration indicating a deterioration in a life cycle of the main battery;
calculating a running cost required for the service provision by multiplying the estimated electric power consumption by an electric power unit price;
calculating a life cycle cost of the service vehicle by calculating a performance reduction amount in the main battery mounted on the service vehicle corresponding to the estimated power consumption and indicating a reduction amount in the life cycle of the main battery;
generating a reference operation plan to be provided to the service vehicle such that a sum of the running cost and the life cycle cost is minimized in total;
calculating, in the service vehicle, a reference total electric power amount consumed by multiple consumption domains during a traveling of the service vehicle based on the reference operation plan;
calculating, in the service vehicle, a reference performance deterioration in the main battery of the service vehicle caused by the travelling based on the reference operation plan;
generating, in the service vehicle, a modified operation plan such that a total amount of electric power consumed by the multiple consumption domains is smaller than the reference total electric power amount and the performance deterioration of the main battery is smaller than the reference performance deterioration;
in response to the modified operation plan being generated, further generating a trade-off condition, which is correlated to the modified operation plan and includes deterioration caused by a change from the reference operation plan to the modified operation plan;
providing the modified operation plan and the trade-off condition to a generation source of the reference operation plan;
obtaining, from the service vehicle, the modified operation plan together with trade-off condition of the modified operation plan;
determining, based on the trade-off condition of the modified operation plan, whether to approve an operation of the service vehicle under the modified operation plan obtained from the service vehicle;
in response to determining to approve the operation of the service vehicle under the modified operation plan, setting a consumption upper limit value and a usage upper limit value of each consumption domain of the service vehicle based on the modified operation plan; and
transmitting, to the service vehicle, a notification to approve the modified operation plan in response to the operation being approved, which operates the service vehicle based on the modified operation plan; and
autonomously controlling the service vehicle based on the modified operation plan.

12. A vehicle allocation management device that manages an allocation of service vehicles used in a mobility service to a user, the service vehicles configured to be autonomously controlled, the vehicle allocation management device comprising:
a consumption estimation unit that estimates, as an energy consumption, an electric power consumption required that is generated in response to a service provision to the user;

a deterioration estimation unit that estimates a performance deterioration in a main battery of a service vehicle associated with the service provision to the user, the performance deterioration indicating a deterioration in a life cycle of the main battery;

a calculation unit that calculates (i) a running cost required for the service provision by multiplying the estimated electric power consumption by an electric power unit price and (ii) a life cycle cost of the service vehicle by calculating a performance reduction amount in the main battery mounted on the service vehicle corresponding to the estimated power consumption and indicating a reduction amount in the life cycle of the main battery;

a plan generation unit that generates a reference operation plan to be provided to the service vehicle such that a sum of the running cost and the life cycle cost is minimized in total; and an arbitration simulation unit that
- calculates, in the service vehicle, a reference total electric power amount consumed by multiple consumption domains during a traveling of the service vehicle based on the reference operation plan,
- calculates, in the service vehicle, a reference performance deterioration in the main battery of the service vehicle caused by the travelling based on the reference operation plan,
- generates, in the service vehicle, a modified operation plan such that a total amount of electric power consumed by the multiple consumption domains is smaller than the reference total electric power amount and the performance deterioration of the main battery is smaller than the reference performance deterioration,
- in response to the modified operation plan being generated, further generates a trade-off condition, which is correlated to the modified operation plan and includes deterioration caused by a change from the reference operation plan to the modified operation plan, and
- provides the modified operation plan and the trade-off condition to a generation source of the reference operation plan; and a plan provision approval unit that obtains, from the service vehicle, a modified operation plan together with trade-off condition of the modified operation plan;

wherein the plan generation unit determines, based on the trade-off condition of the modified operation plan, whether to approve an operation of the service vehicle under the modified operation plan obtained from the service vehicle, and in response to determining to approve the operation of the service vehicle under the modified operation plan, sets a consumption upper limit value and a usage upper limit value of each consumption domain of the service vehicle based on the modified operation plan, and transmits, to the service vehicle, a notification to approve the modified operation plan in response to the operation being approved, which operates the service vehicle based on the modified operation plan, and the service vehicle is autonomously controlled based on the modified operation plan.

* * * * *